(12) United States Patent
Bowles et al.

(10) Patent No.: US 7,098,296 B2
(45) Date of Patent: Aug. 29, 2006

(54) PREPARATION OF POLYMERIC ARYL SULFONAMIDE

(75) Inventors: Timothy Bowles, Merseyside (GB); Robert Lambie Rooney, Bridge of Weir (GB); Clifford John Coles, Cam Dursley (GB); Brian Rowatt, East Kilbride (GB)

(73) Assignee: Sun Chemical Corporation, NJ (US)

( * ) Notice: Subject to any disclaimer, the term of this patent is extended or adjusted under 35 U.S.C. 154(b) by 65 days.

(21) Appl. No.: 10/046,424

(22) Filed: Oct. 25, 2001

(65) Prior Publication Data

US 2004/0006156 A1    Jan. 8, 2004

(51) Int. Cl.
  *C08G 73/06* (2006.01)
(52) U.S. Cl. ........................ 528/422; 528/391; 523/160; 523/161; 524/609; 106/31.13; 106/31.6; 106/31.87
(58) Field of Classification Search .............. 528/391, 528/422; 523/160, 161; 524/609; 106/31.13, 106/31.6, 31.87
See application file for complete search history.

(56) References Cited

U.S. PATENT DOCUMENTS

| | | | | |
|---|---|---|---|---|
| 2,667,468 A | * | 1/1954 | Donald et al. | 528/391 |
| 2,808,394 A | * | 10/1957 | Speck | 528/391 |
| 2,994,693 A | * | 8/1961 | Norman et al. | 534/573 |
| 3,403,200 A | * | 9/1968 | Randall | 525/66 |
| 4,107,155 A | * | 8/1978 | Fletcher et al. | 528/373 |
| 4,247,625 A | * | 1/1981 | Fletcher et al. | 430/336 |
| 5,574,078 A | * | 11/1996 | Elwakil | 523/161 |
| 5,747,554 A | * | 5/1998 | Sacripante et al. | 523/161 |
| 5,951,749 A | * | 9/1999 | Krepski et al. | 106/31.75 |
| 6,194,498 B1 | * | 2/2001 | Anderson et al. | 524/168 |
| 2004/0007521 A1 | * | 1/2004 | Kurth et al. | 210/483 |

FOREIGN PATENT DOCUMENTS

WO    WO 9810022 A1 *    3/1998

OTHER PUBLICATIONS

IBM Technical Disclosure Bulletin, "Photolytically Solubilized Polysulfonamides." Dec. 1968.*

* cited by examiner

*Primary Examiner*—Margaret G. Moore
(74) *Attorney, Agent, or Firm*—Dickstein, Shapiro, Morin & Oshinsky, LLP.

(57) ABSTRACT

A method of preparing a polymeric aryl sulfonamide is described which consists of reacting aryl sulfonyl with a polymeric amine in the presence of an acid acceptor. Also, another method of preparing a polymeric aryl sulfonamide is disclosed and consists of: reacting an aryl sulfonyl with a polymeric diamine in the presence of an acid acceptor to result in a linear oligomeric molecule; and reacting the linear oligomeric molecule with a monoamine or an aryl monosulfonyl in the presence of an acid acceptor. The use of polymeric aryl sulfonamides as pigment dipersants and wetting agents is also disclosed.

25 Claims, No Drawings

PREPARATION OF POLYMERIC ARYL SULFONAMIDE

FIELD OF THE INVENTION

This invention relates to novel methods of preparing polymeric aryl sulfonamides. The invention also relates to the use of polymeric aryl sulfonamides as universal pigment dispersants and wetting agents.

BACKGROUND OF THE INVENTION

The dispersion of pigments in liquid ink systems is commonly achieved in an initial grinding step in the presence of a dispersing resin, such as nitrocellulose. The pigment dispersion is then added to a "let-down" resin, such as a polyamide, polyester, vinyl, acrylic, or polyurethane resin, depending on the requirement of a given substance.

Not all dispersants are compatible with all common let-down resins, e.g., nitrocellulose in polyamides of high molecular weight and vinyl resins. This requires the preparation and storage of several pigment dispersions, each specific for one or more let-down resins. A "universal" pigment dispersant would obviate this requirement.

In addition, adhesion promoting substances also called wetting agents generally consist of surface-active agents that function primarily by reducing the surface tension of liquids, i.e., let-down resins to facilitate the wetting of that function primarily by reducing the surface tension of liquids, i.e., let-down resins to facilitate the wetting of solids, i.e., pigments. In the past, their use had to be carefully controlled as each pigment/vehicle combination would behave differently and require changes in formulations to give stable systems (Printing Ink Handbook, 1988, p. 22).

The use of aryl sulfonamides in the prior art has been primarily as plasticizers, i.e., as liquid or solid additives to resin systems to impart flexibility in coatings (D. Aelony, Ind. Eng. Chem. 46:587 (1954)). Polymers derived from diamines and aryl disulfonyl chlorides have been prepared, generally via interfacial polymerization, for use in heat-resistant coatings and as blowing agents. Their use as adhesion promoting and/or pigment dispersing agents has not been reported.

SUMMARY OF THE INVENTION

The present invention relates to a method of preparing a polymeric aryl sulfonamide comprising reacting an aryl sulfonyl with a polymeric amine in the presence of an acid acceptor.

The present invention also relates to a method of preparing a polymeric aryl sulfonamide comprising:

(a) reacting an aryl sulfonyl with a polymeric diamine in the presence of an acid acceptor to result in a linear oligomeric molecule; and (b) reacting said linear oligomeric molecule with a monoamine or aryl monosulfonyl in the presence of an acid acceptor.

The present invention further provides a method of preparing an ink composition comprising dispersing a pigment with a polymeric aryl sulfonamide.

The present invention also provides a method of preparing an ink composition comprising wetting a pigment dispersion with a polymeric aryl sulfonamide.

DETAILED DESCRIPTION OF THE INVENTION

It has now surprisingly been found that a polymeric aryl sulfonamide can be prepared by reacting an aryl sulfonyl with a polymeric amine in the presence of an acid acceptor.

Preferably, the polymeric aryl sulfonamide of the invention is selected from the group consisting of polymeric monoaryl sulfonamide, polymeric diaryl sulfonamide and polymeric triaryl sulfonamide. Also preferably, the aryl sulfonyl is an aryl monosulfonyl or an aryl disulfonyl, more preferably, an aryl sulfonyl chloride and most preferably paratoluene sulfonyl cloride.

The polymeric amine may be selected from the group consisting of polymeric monoamine, polymeric diamine and polymeric triamine. More preferably, the polymeric amine is selected from the group consisting from JEFFAMINE M-600 (reaction product of a monohydric alcohol and propylene oxide), JEFFAMINES D230, D400, D2000 (amine terminated polypropylene glycols of differing molecular weight), JEFFAMINE ED-600 (polyether diamines, predominately based on polyethylene oxide backbone), and JEFFAMINE T-403 (reaction product of propylene oxide and a triol initiator).

Any acid acceptor can be used in the processes of the present invention such as sodium carbonate.

Alternatively, polymeric aryl sulfonamides can also be prepared by: (a) reacting an aryl sulfonyl with a polymeric diamine in the presence of an acid acceptor to result in a linear oligomeric molecule; and (b) reacting said linear oligomeric molecule with a monoamine or an aryl monosulfonyl, preferably an aryl monosulfonyl halide and most preferably paratoluene sulfonyl chloride in the presence of an acid acceptor.

Preferably, the aryl sulfonyl is an aryl monosulfonyl or an aryl disulfonyl, more preferably, an aryl disulfonyl chloride and most preferably paratoluene sulfonyl cloride. Also preferably, the aryl disulfonyl chloride is 4,4'-di (chlorosulfonyl) diphenyl methane or 4,4'-di(chlorosulfonyl) diphenyl ether. The aryl monosulfonyl of step (b) is preferably an aryl monosulfonyl halide and most preferably paratoluene sulfonyl chloride. In addition, any polymeric diamine may be used but an amine terminated polypropylene glycol is preferred. Also any monoamine may be used in step (b) but ethylamine is preferred.

It has also surprisingly been found that polymeric aryl sulfonamides of the present invention are compatible with common liquid ink pigments/vehicles systems and can serve as pigment dispersants and adhesion promoting agents.

EXAMPLE 1

To a slurry of para toluene sulfonyl chloride (227 g) in 250.0 g of 4-methyl-2-pentanone (250 g, MIBK) a solution of JEFFAMINE D-400 (250 g) in MIBK (200 g) is added at ambient temperatures over a 90 to 120 minute period. After one half of this solution had been added, the addition of a solution of sodium carbonate (68.8 g) in water (400 g) was commenced. The simultaneous reagent additions are regulated in such a manner that the addition time of the sodium carbonate solution equals the addition time of the JEFFAMINE D-400 solution. The temperature of the exothermic reaction is maintained at 60° C. or less, by means of an external water bath. After all the reagents have been added, the reaction mixture is heated to 70° C. and held at that temperature for an additional two hour period. The reaction mixture is then transferred to a separatory funnel and the bottom aqueous layer is removed and discarded. The organic mixture is washed with two portions of saline water and then transferred to a rotary evaporator. The MIBK solvent is removed under reduced pressures (30 in. of Hg.) and a water-bath temperature of 70° C. The clear, honey-colored residual product, weighing 438.0 g was found to have a non-volatile content of 95.5% (sample dried at 150° C./30 minutes) and a Brookfield viscosity of 63.0 poises (25° C., spindle No. 6, 100 to 10 rpm). The non-volatile product weight corresponds to a yield of 94.6% of theory.

EXAMPLE 2

To a stirred slurry of 4,4'-di (chlorosulfonyl) diphenyl methane (120 g) in n-propyl acetate (170 g), a solution of 73.8 g of Jeffamine D-400 in 170.0 g of n-propyl acetate was added over a 70 minute period. During the course of the addition, the reaction temperature was allowed to rise from 20 to 30° C. A solution of sodium carbonate (17.3 g) in water (200 g) was then added over a 45 minute period while the reaction mixture was warmed to 35° C. A solution of 70% aqueous ethylamine (25 g) in 100 ml. of water was then added over a 15 minute period, followed by a solution of sodium carbonate (20 g) in 200.0 g of water. The reaction mixture was stirred for an additional two hour period while the reaction temperature was raised to 65° C. The mixture was then transferred to a separatory funnel and the bottom aqueous layer was removed. The organic layer was twice washed with saline water, then stripped to near dryness under reduced pressures (30 in. of Hg.) bath temp. of 75° C. The residue consisted of 185.8 of a red-brown colored viscous liquid, having a non-volatile content of 97.2%, and a viscosity of 2.2 poises at 150° C. (ICI cone and plate viscometer).

The invention has been described in terms of preferred embodiments thereof, but is more broadly applicable as will be understood by those skilled in the art. The scope of the invention is only limited by the following claims.

What is claimed is:

1. A method of preparing a polymeric aryl sulfonamide pigment dispersing agent comprising reacting a monocyclic aryl sulfonyl with an aliphatic polymeric amine in the presence of an acid acceptor, wherein said polymeric aryl sulfonamide is polymeric diaryl sulfonamide or polymeric triaryl sulfonamide.

2. The method of claim 1, wherein said aryl sulfonyl is an aryl disulfonyl.

3. The method of claim 2, wherein said aryl disulfonyl is an aryl disulfonyl halide.

4. The method of claim 3, wherein said aryl disulfonyl halide is an aryl disulfonyl chloride.

5. The method of claim 4, wherein said aryl disulfonyl chloride is 4,4'-di(chlorosulfonyl)diphenyl methane or 4,4'-di(chlorosulfonyl)diphenyl ether.

6. The method of claim 1, wherein said polymeric amine is selected from the group consisting of polymeric monoamine, polymeric diamine and polymeric triamine.

7. The method of claim 1, wherein said acid acceptor is sodium carbonate.

8. A polymeric aryl sulfonamide prepared according to the method of claim 1.

9. A method of preparing a polymeric aryl sulfonamide comprising:

(a) reacting an aryl sulfonyl with a polymeric diamine in the presence of an acid acceptor to result in a linear oligomeric molecule; and (b) reacting said linear oligomeric molecule with a monoamine or an aryl monosulfonyl in the presence of an acid acceptor.

10. The method of claim 9, wherein said polymeric aryl sulfonamide is selected from the group consisting of polymeric monoaryl sulfonamide, polymeric diaryl sulfonamide and polymeric triaryl sulfonamide.

11. The method of claim 9, wherein said aryl sulfonyl is an aryl monosulfonyl or an aryl disulfonyl.

12. The method of claim 11, wherein said aryl disulfonyl is an aryl disulfonyl halide.

13. The method of claim 12, wherein said aryl disulfonyl halide is an aryl disulfonyl chloride.

14. The method of claim 13, wherein said aryl disulfonyl chloride is 4,4'-di(chlorosulfonyl)diphenyl methane or 4,4'-di(chlorosulfonyl)diphenyl ether.

15. The method of claim 9, wherein said aryl monosulfonyl is an aryl monosulfonyl halide.

16. The method of claim 15, wherein said aryl monosulfonyl halide is paratoluene sulfonyl chloride.

17. The method of claim 9, wherein said polymeric diamine is an amine terminated polypropylene glycol.

18. The method of claim 9, wherein the monoamine of step (b) is ethylamine.

19. The method of claim 9, wherein said acid acceptor is sodium carbonate.

20. A method of preparing an ink composition comprising dispersing a pigment in the presence of a polymeric aryl sulfonamide prepared according to the method of claim 9.

21. A method of preparing an ink composition comprising wetting a pigment dispersion in the presence of a polymeric aryl sulfonamide prepared according to the method of claim 9.

22. A polymeric aryl sulfonamide prepared according to the method of claim 9.

23. A method of preparing an ink composition comprising dispersing a pigment in the presence of a polymeric aryl sulfonamide prepared by reacting an aryl sulfonyl with a polymeric amine in the presence of an acid acceptor, wherein said polymeric aryl sulfonamide is selected from the group consisting of polymeric monoaryl sulfonamide, polymeric diaryl sulfonamide and polymeric triaryl sulfonamide.

24. A method of preparing an ink composition comprising wetting a pigment dispersion in the presence of polymeric aryl sulfonamide prepared by reacting an aryl sulfonyl with a polymeric amine in the presence of an acid acceptor, wherein said polymeric aryl sulfonamide is selected from the group consisting of polymeric monoaryl sulfonamide, polymeric diaryl sulfonamide and polymeric triaryl sulfonamide.

25. A method of preparing polymeric monoaryl sulfonamide pigment dispersing agent comprising reacting paratoluene sulfonyl chloride with an aliphatic polymeric amine in the presence of an acid acceptor.

* * * * *